(12) United States Patent
Lee et al.

(10) Patent No.: US 9,746,884 B2
(45) Date of Patent: Aug. 29, 2017

(54) STRETCHABLE DISPLAY DEVICE

(71) Applicant: SAMSUNG DISPLAY CO., LTD., Yongin-si, Gyeonggi-Do (KR)

(72) Inventors: Sang Wol Lee, Yongin-si (KR); Won Il Choi, Ansan-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/874,695

(22) Filed: Oct. 5, 2015

(65) Prior Publication Data

US 2016/0239051 A1     Aug. 18, 2016

(30) Foreign Application Priority Data

Feb. 13, 2015   (KR) .......................... 10-2015-0022407

(51) Int. Cl.
    *G06F 1/16*     (2006.01)
(52) U.S. Cl.
    CPC .......... *G06F 1/1652* (2013.01); *G06F 1/1626* (2013.01)

(58) Field of Classification Search
    CPC ..... G06F 1/1647; G06F 1/1649; G06F 1/1692
    See application file for complete search history.

(56) References Cited

U.S. PATENT DOCUMENTS

| 2010/0232094 | A1  | 9/2010  | Chen |
| 2010/0295761 | A1  | 11/2010 | Van Lieshout et al. |
| 2013/0021762 | A1  | 1/2013  | Van Dijk et al. |
| 2015/0092328 | A1* | 4/2015  | Chen ..................... G06F 1/1624 361/679.04 |

FOREIGN PATENT DOCUMENTS

| KR | 10-2014-0057935 A | 5/2014 |
| KR | 10-2014-0059274 A | 5/2014 |
| KR | 10-2014-0063306 A | 5/2014 |

* cited by examiner

*Primary Examiner* — Anne Hines
(74) *Attorney, Agent, or Firm* — Lee & Morse, P.C.

(57) ABSTRACT

A stretchable display device includes a stretchable display that changes between extended and retracted states, a slider surrounding an edge of the stretchable display and having a variable length, and a cover that includes a plurality of unit bodies surrounding an outer surface of the slider.

13 Claims, 7 Drawing Sheets

STRETCHABLE DISPLAY DEVICE

CROSS-REFERENCE TO RELATED APPLICATION

Korean Patent Application No. 10-2015-0022407, filed on Feb. 13, 2015, and entitled, "Stretchable Display Device," is incorporated by reference herein in its entirety.

BACKGROUND

1. Field

One or more embodiments described herein relate to a stretchable display device.

2. Description of the Related Art

A variety of portable electronic devices equipped with integrated displays have been developed to satisfy consumer demand. Examples include smartphones, media players, and tablet computers. Users typically want small-sized devices for carrying convenience, e.g., device that may be carried in a pocket or wallet. At the same time, users want large size display screens for visual satisfaction. Thus, manufactures have developed flexible displays. However, these devices have discrete display screens that fold and unfold along one or more hinges. When the hinges bend or are otherwise damaged, the flexible device may be damaged.

SUMMARY

In accordance with one or more embodiments, a stretchable display device includes a stretchable display to change between extended and retracted states; a slider surrounding an edge of the stretchable display and having a variable length; and a cover including a plurality of unit bodies surrounding an outer surface of the slider. The slider may include at least one first sliding section surrounding at least a portion of the edge of the stretchable display; and a second sliding section surrounding the at least one first sliding section, the second sliding section to move along a length direction of the at least one first sliding section. Two first sliding sections may be coupled to one edge of the stretchable display, the two first sliding sections spaced apart from each other.

The stretchable display may include a display area to output an image; wiring areas at edges of the display area; and a plurality of connectors at vertexes of the display area, each of the connectors to connect adjacent wiring areas. Each connector may be bent with first and second ends, the first end may be connected to a first wiring area, and the second end may be connected to a second wiring area adjacent to the first wiring area. When the unit bodies move away from each other, the stretchable display may extend, and when the unit bodies move closer to each other, the stretchable display may retract. When the unit bodies are closest to each other, the cover may have substantially a closed curve shape.

In accordance with one or more embodiments, a display device includes a stretchable display; and a slider connected to the stretchable display; and a cover connected to the slider, wherein the cover includes a plurality of sections that are to move along the slider when forces are applied to at least one pair of opposing sides or corners of the cover, a screen of the stretchable display to change size when the sections move along the slider.

The sections of the cover may move away from one another along the slider when the forces pull the at least one pair of opposing sides along a first axis. The sections of the cover may move toward one another along the slider when the forces push the at least one pair of opposing sides along the first axis. The sections of the cover may move away from one another along the slider when the forces pull another pair of opposing sides along a second axis. The sections of the cover may move toward one another along the slider when the forces push the other pair of opposing sides along the second axis. The sections of the cover may move away from one another along the slider relative to two axes when the forces pull the at least one pair of opposing corners.

The slider may include a first sliding section connected to the cover; and a second sliding section connected to the stretchable display, where the second sliding section may move relative to the first sliding section. The first sliding section may move along a first axis relative to the second sliding section when the forces are applied to a first pair of opposing sides of the cover, and the first sliding section may move along a second axis relative to the second sliding section when the forces are applied to a second pair of opposing sides of the cover.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
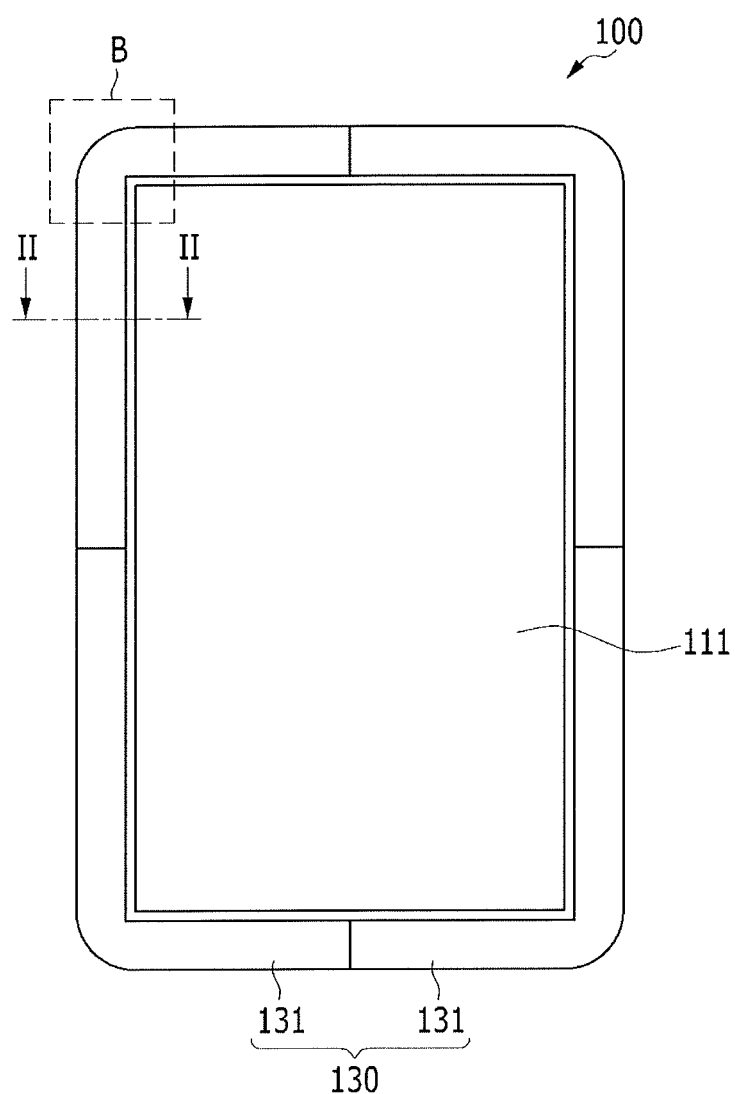
FIG. 1 illustrates an embodiment of a stretchable display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Throughout the present specification, when any component is referred to as being "connected to" another component, it means that any component is "directly connected to" another component or is "indirectly connected to" another component while having another member interposed therebetween. In addition, unless explicitly described to the contrary, the word "comprise" and variations such as "comprises" or "comprising", will be understood to imply the inclusion of stated elements but not the exclusion of any other elements.

Figure 2:
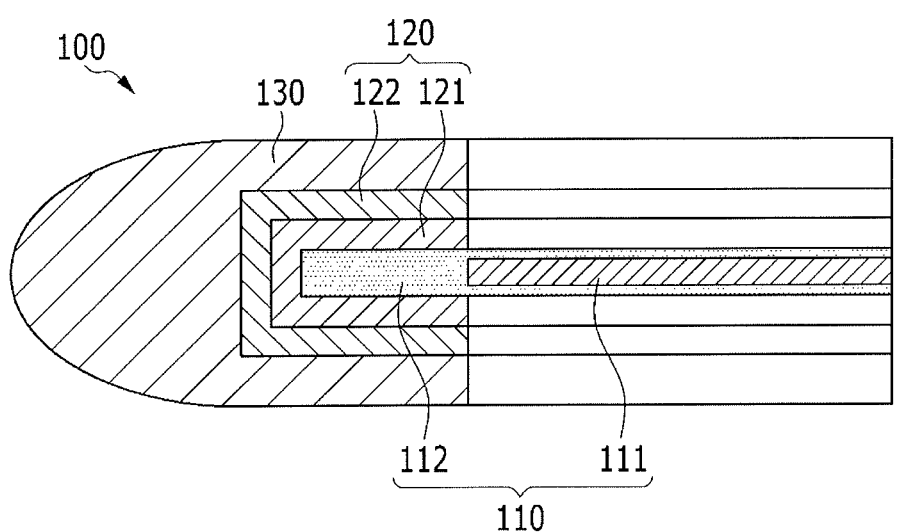
FIG. 2 illustrates a view along section line II-II in FIG. 1.

FIG. 1 illustrates an embodiment of a stretchable display device 100 and FIG. 2 is a cross-sectional view of the stretchable display device 100 along line II-II in FIG. 1. Referring to FIGS. 1 and 2, the stretchable display device 100 includes a stretchable display unit 110, a sliding unit 120, and a cover unit 130. The stretchable display unit 110 is extensible and retractable, e.g., flexibly extended and/or retracted by an external force. A plurality of pixels and wirings configuring a screen are formed on a stretchable substrate.

The sliding unit 120 surrounds an edge portion of the stretchable display unit 110 and may have a variable length.

The cover unit 130 includes a plurality of unit bodies 131 that surround an outer surface of the sliding unit 120. The cover unit 130 protects the sliding unit 120 from external contact. The unit bodies 131 have a predetermined shape, e.g., a, L shape. The unit bodies 131 may surround corner portions of the sliding unit 120. Portions of the unit bodies 131 corresponding to the corner portions of the sliding unit 120 may be rounded.

In this embodiment, the sliding unit 120 includes a first sliding member 121 and a second sliding member 122. The first sliding member 121 surrounds at least a portion of the edge of the stretchable display unit 110. The cross-sectional shape of the first sliding member 121 may be, for example, rectangular or square having one opened surface. A portion of the stretchable display unit 110 may be coupled to the first sliding member 121 through an opened portion of the first sliding member 121.

The first sliding member 121 may be formed at a portion adjacent to the corner of the stretchable display unit 110. For example, the first sliding member 121 may be a predetermined fraction (e.g., one third) of the length of any one edge of the stretchable display unit 110 and may be formed at the portion adjacent to the corner of the stretchable display unit 110. Two first sliding members 121 may be coupled to one edge of the stretchable display unit 110, and the two first sliding members 121 may be spaced apart from each other.

The second sliding member 122 surrounds the first sliding member 121 and moves along a length direction of the first sliding member 121. The cross-sectional shape of the second sliding member 122 may be, for example, rectangular or square, and may have one opened surface similar to the cross-sectional shape of the first sliding member 121. The second sliding member 122 has internal space equal to or larger than the first sliding member 121. The first sliding member 121 may be accommodated in the internal space of the second sliding member 122. The second sliding member 122 and the first sliding member 121 may move with each other along the length direction.

The cover unit 130 may be coupled to an outer surface of the second sliding member 122. When a user applies force to the cover unit 130, the second sliding member 122 may move with the bodies 131 of the cover unit 130.

In this arrangement of the sliding unit 120 having the first sliding member 121 and the second sliding member 122, the edge portion of the stretchable display unit 110 may be protected by the first sliding member 121. Further, the distance between the unit bodies 131 may change based on forces applied by the user.

Figure 3:
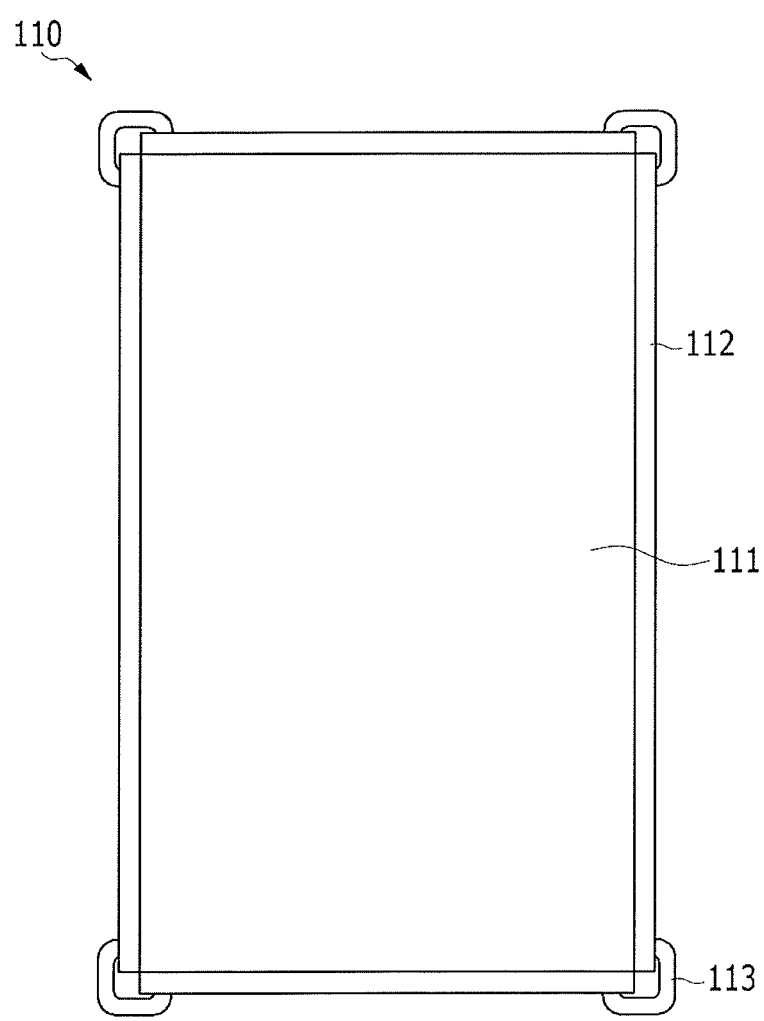
FIG. 3 illustrates an embodiment of a stretchable display unit.
Figure 4:
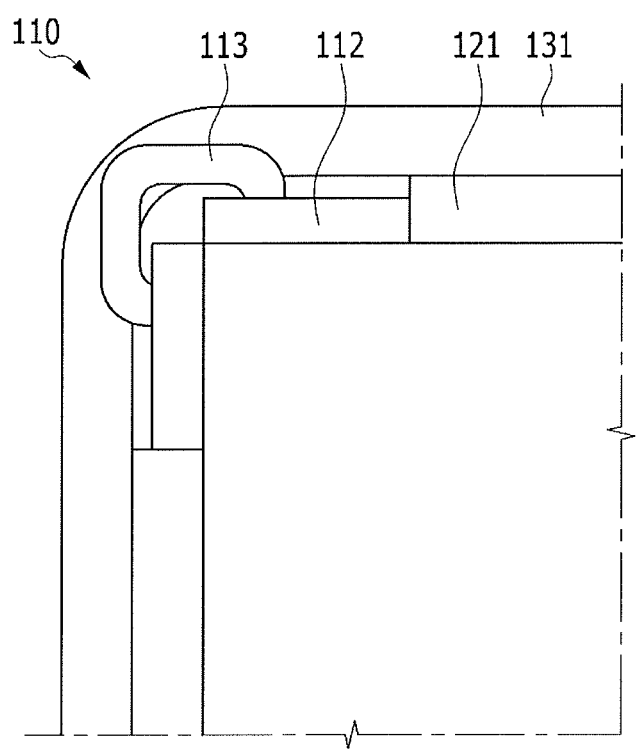
FIG. 4 illustrates another view of the stretchable display unit.

FIG. 3 illustrates an embodiment of the stretchable display unit 110 of the stretchable display device 100, and FIG. 4 illustrates a state in which the stretchable display unit 110 corresponds to region B of the stretchable display device 100.

Referring to FIGS. 3 and 4, the stretchable display unit 110 includes a displaying part 111, a wiring part 112, and a connecting part 113. The displaying part 111 includes, for example, pixels with organic light emitting devices for displaying an image. The organic light emitting devices may be patterned on the displaying part 111. The displaying part 111 may have a stretchable structure.

The wiring part 112 may be at edges of the displaying part 111 and connected to wirings in the displaying part 111, and may be connected, for example, to an external circuit part. For example, when the displaying part 111 has a rectangular shape, each of four wiring parts 112 may be formed at corresponding edges of the displaying part 111. In another embodiment, a number of (e.g., two) wiring parts 112 may be formed at one or more edges of the displaying part 111.

The wiring part 112 may carry electrical signals between the displaying part 111 and various circuit elements. The wiring part 112 may include, for example, a gate driver integrated circuit (IC) and/or a data driver IC connected to gate lines and/or data lines in the displaying part 111.

The data driver IC receives an image data signal, for example, from an external source and generates data signals for corresponding pixels. The data signal are supplied to the data lines of the displaying part 111. The gate driver IC generates and supplies gate signals for driving the pixels of the displaying part 111.

The connecting parts 113 may be at vertexes of the displaying part 111, to connect two adjacent wiring parts 112. The connecting part 113 may be, for example, a printed circuit board. In one embodiment, the connecting part 113 may be a flexible printed circuit board which may bend and/or stretch.

In one embodiment, the connecting part 113 may be bent with multiple ends. One end of the connecting part 113 may be connected to one wiring part 112 and the other end thereof may be connected to another wiring part 112 adjacent to the wiring part 112. The connection part 113 has a predetermined shape, e.g., a C shape. The two adjacent wiring parts 112 may be electrically connected to each other by the connecting part 113.

In this embodiment, when the unit bodies 131 are moved away from each other, the stretchable display unit 110 extends. When the unit bodies 131 are moved in an opposite direction toward one, the stretchable display unit 110 retracts. When the unit bodies 131 are closest to one another, the cover unit 130 may be formed to have a closed curve shape. Therefore, when the stretchable display device 100 has a smallest size, the stretchable display device 100 may be viewed as a single member (not as members separated from each other), an aesthetic appearance of the display device 100 may be improved.

Figure 5:
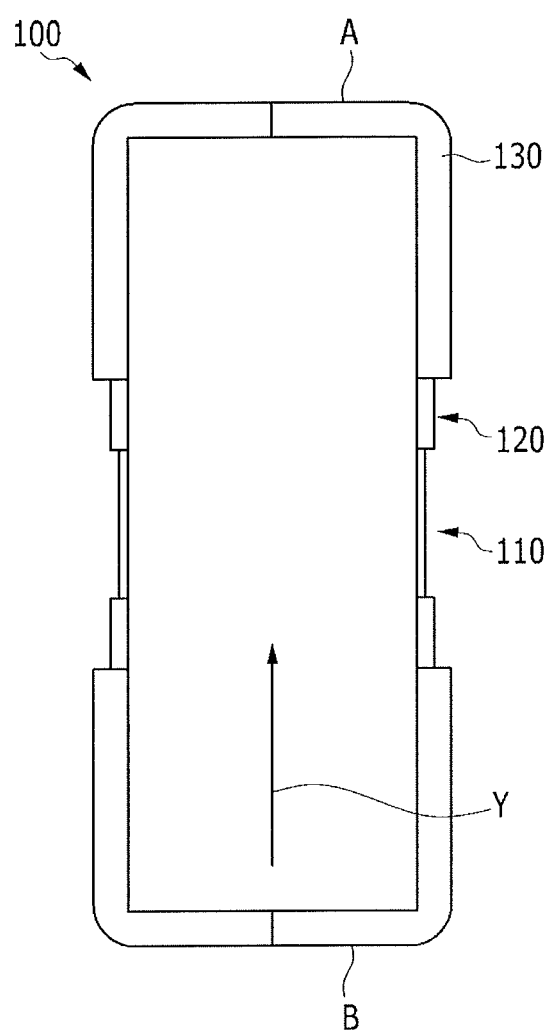
FIG. 5 illustrates an elongated state of the stretchable display device.

FIG. 5 illustrates an example of when the stretchable display device 100 in FIG. 1 is elongated in a first (e.g., vertical) direction. As shown in FIG. 5, the stretchable display device 100 extends in the vertical direction along a first axis Y by external forces, e.g., when a user pulls sides A and B of the display device 100 in opposing directions. In this case, the second sliding member 122 moves with respect to the first sliding member 121 (see, e.g., FIG. 2) of the sliding unit 120. When this occurs, the stretchable display unit 110 also extends in the vertical direction.

Figure 6:
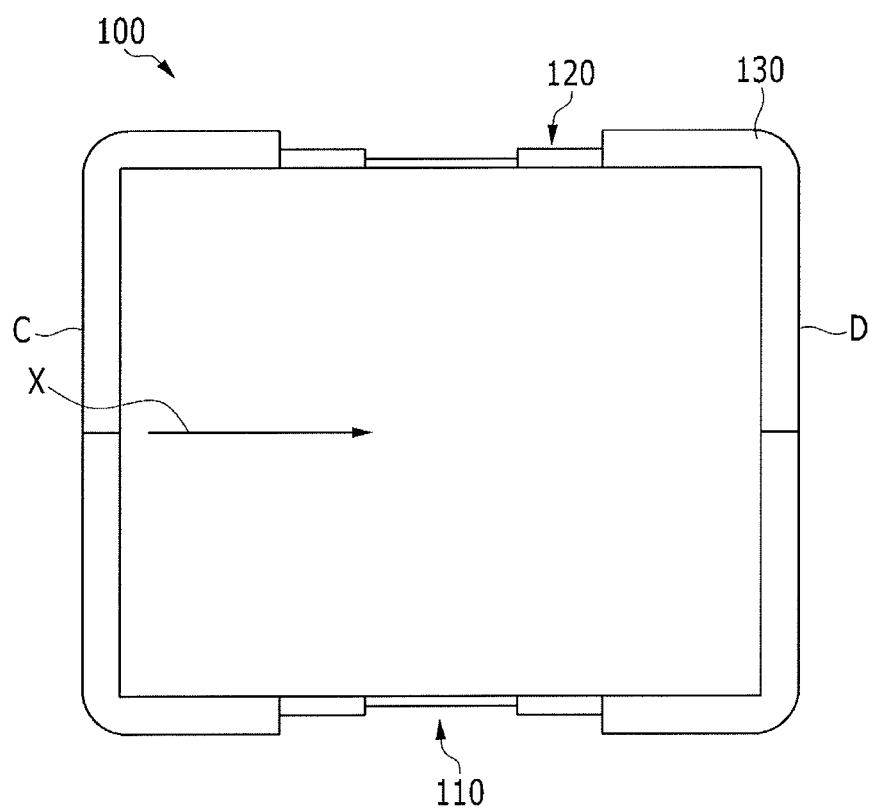
FIG. 6 illustrates another elongated state of the stretchable display device.

FIG. 6 illustrates an example of when the stretchable display device 100 in FIG. 1 is elongated in a second (e.g., horizontal) direction. As shown in FIG. 6, the stretchable display device 100 extends in the horizontal direction along a second axis X by external forces, e.g., when a user pulls sides C and D of the display device 100 in opposing directions. In this case, the second sliding member 122 moves with respect to the first sliding member 121 (see, e.g., FIG. 2) of the sliding unit 120. When this occurs, the stretchable display unit 110 also extends in the horizontal direction.

Figure 7:
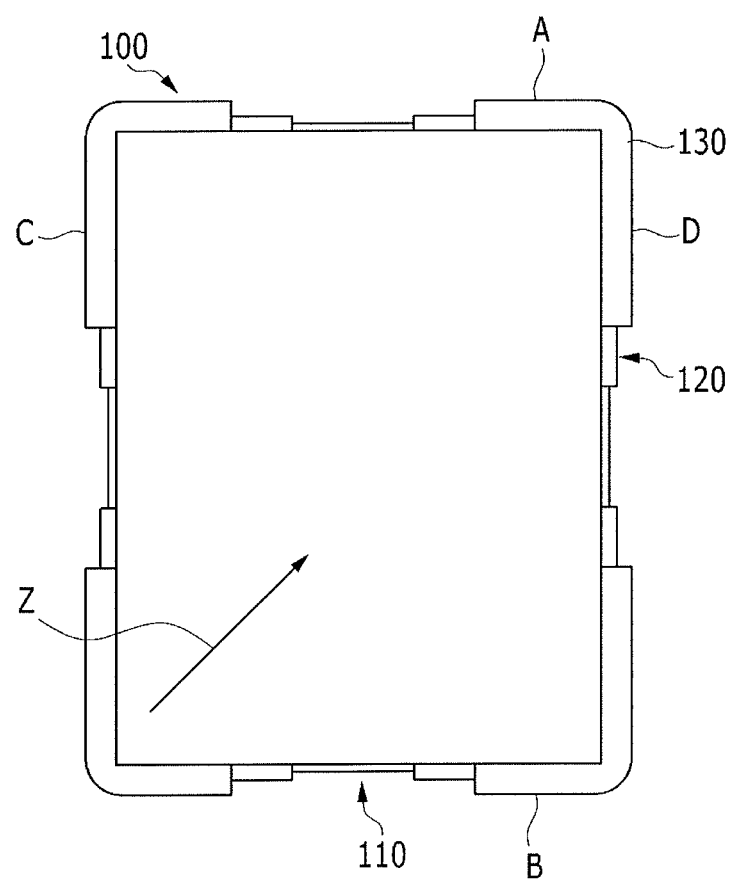
FIG. 7 illustrates another elongated state of the stretchable display device.

FIG. 7 illustrates an example of when the stretchable display device 100 in FIG. 1 is elongated in the vertical and horizontal directions. As shown in FIG. 7, the stretchable display device 100 extends in the horizontal and vertical directions by external forces, e.g., when sides A and B and sides C and D are pulled in opposing directions or when opposing corners of the cover are pulled in opposing directions along the Z axis. The stretchable display device may retract when a user pushes the opposing corners or sides. In this case, the displaying part of the stretchable display unit 110 may have the largest size. Accordingly, a user may view the image through a largest version of the screen.

In the stretchable display device 100, when the unit bodies 131 move away from each other as a result of a user grasping the cover unit 130 and pulling, the stretchable display unit 110 extends to a larger size. Therefore, the user may view the image output from the displaying part 111 of the stretchable display unit 110 through a larger screen. In addition, when the user desires to carry the stretchable display device 100, the size of the display device 100 may be reduced by pushing the sides together to make the unit bodies 131 close to each other. Thus, in accordance with at least one embodiment, a display device is provided which has a variable screen size (changing between large and small screens) and which may also be easily carried.

While this invention has been described in connection with what is presently considered to be practical exemplary embodiments, the drawings and the detailed description of the present invention which are described above are merely illustrative, are just used for the purpose of describing the present invention, and are not used for qualifying the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention should be determined by the spirit of the appended claims.

What is claimed is:

1. A stretchable display device, comprising:
a stretchable display to change between extended and retracted states;
a slider surrounding an edge of the stretchable display and having a variable length; and
a cover including a plurality of unit bodies surrounding an outer surface of the slider, wherein the display area is to stretch when the stretchable display changes from the retracted state to the extended state, wherein the stretchable display includes:
a display area to output an image,
wiring areas at edges of the display area, and
a plurality of connectors at vertexes of the display area, each of the connectors to connect adjacent wiring areas.

2. The display device as claimed in claim 1, wherein the slider includes:
at least one first sliding section surrounding at least a portion of the edge of the stretchable display; and
a second sliding section surrounding the at least one first sliding section, the second sliding section to move along a length direction of the at least one first sliding section.

3. The display device as claimed in claim 2, wherein two first sliding sections are coupled to one edge of the stretchable display, the two first sliding sections spaced apart from each other.

4. The display device as claimed in claim 1, wherein:
each connector is bent with first and second ends,
the first end is connected to a first wiring area, and
the second end is connected to a second wiring area adjacent to the first wiring area.

5. The display device as claimed in claim 1, wherein:
when the unit bodies move away from each other, the stretchable display extends, and
when the unit bodies move closer to each other, the stretchable display retracts.

6. The display device as claimed in claim 1, wherein:
when the unit bodies are closest to each other, the cover has substantially a closed curve shape.

7. A display device, comprising:
a stretchable display; and
a slider connected to the stretchable display; and
a cover connected to the slider, wherein the cover includes a plurality of sections that are to move along the slider when forces are applied to at least one pair of opposing sides or corners of the cover, a screen of the stretchable display to change size when the sections move along the slider, wherein the sections of the cover are to move away from one another along the slider relative to two axes when the forces pull the at least one pair of opposing corners.

8. The display device as claimed in claim 7, wherein the sections of the cover are to move away from one another along the slider when the forces pull the at least one pair of opposing sides along a first axis.

9. The display device as claimed in claim 8, wherein the sections of the cover are to move toward one another along the slider when the forces push the at least one pair of opposing sides along the first axis.

10. The display device as claimed in claim 9, wherein the sections of the cover are to move away from one another along the slider when the forces pull another pair of opposing sides along a second axis.

11. The display device as claimed in claim 10, wherein the sections of the cover are to move toward one another along the slider when the forces push the other pair of opposing sides along the second axis.

12. The display device as claimed in claim 7, wherein the slider includes:
a first sliding section connected to the cover; and
a second sliding section connected to the stretchable display, the second sliding section to move relative to the first sliding section.

13. The display device as claimed in claim 12, wherein:
the first sliding section is to move along a first axis relative to the second sliding section when the forces are applied to a first pair of opposing sides of the cover, and
the first sliding section is to move along a second axis relative to the second sliding section when the forces are applied to a second pair of opposing sides of the cover.

* * * * *